United States Patent [19]

Peelen

[11] Patent Number: 4,605,719

[45] Date of Patent: Aug. 12, 1986

[54] LIQUID, CURABLE COATING COMPOSITION BASED ON A HYDROXYL GROUPS-CONTAINING ADDITION POLYMER AS BINDER

[75] Inventor: Frank C. Peelen, Hoogerheide, Netherlands

[73] Assignee: Aszo NV, Arnhem, Netherlands

[21] Appl. No.: 762,421

[22] Filed: Aug. 5, 1985

[30] Foreign Application Priority Data

Aug. 17, 1984 [NL] Netherlands .......................... 8402531

[51] Int. Cl.$^4$ ............................................. C08F 20/18
[52] U.S. Cl. ..................................... 526/282; 524/553
[58] Field of Search .......................... 526/282; 524/553

[56] References Cited

U.S. PATENT DOCUMENTS 3,681,298  8/1972  Hurwitz ............................. 526/282
3,799,972  3/1974  Cawley et al. .................. 260/486 R
3,940,353  2/1976  Martorano ......................... 526/282
4,388,434  6/1983  Swift .................................. 526/282

*Primary Examiner*—Paul R. Michl
*Attorney, Agent, or Firm*—Parkhurst & Oliff

[57] ABSTRACT

Liquid, curable coating compositions are provided based on an addition polymer containing hydroxyl groups and a curing agent. The compositions have a high solids content and hence a low solvent emission upon application. The addition copolymer contains structural units derived from isobornyl (meth)acrylate and/or a mono-ethylenically unsaturated compound of decahydronaphthalene and/or tricyclo(5.2.1.0$^{2,6}$) and has a Mn of 600–15000 and a hydroxyl number of 30–320. The curing agent may be (blocked) isocyanate or methylolated aminoplast resin.

The composition may be applied to vehicles as a top coat.

9 Claims, No Drawings

LIQUID, CURABLE COATING COMPOSITION BASED ON A HYDROXYL GROUPS-CONTAINING ADDITION POLYMER AS BINDER

The invention relates to a liquid, curable coating composition based on a hydroxyl groups-containing addition polymer as binder and a curing agent. Coating compositions of the type indicated above generally have the disadvantage that they have a low solids content.

The invention has for its object to provide a coating composition which under otherwise the same processing conditions as used for conventional compositions has a solids content which is higher, for instance, by about 10%. Such an improvement implies that upon an increase in solids content from, say, 54 to 60% by weight, a saving of 22% on solvents is achieved and hence a substantial reduction of the emission of solvents.

Japanese Laid-Open Patent Application No. 126 861/82 relates to hydroxyl groups-containing addition polymers which are partly built up from dicyclopentadiene derivatives substituted with an oxyalkyl(meth)acrylate group. However, the polycyclic moiety of these dicyclopentadiene derivatives contains a double bond. European Patent Application No. 96 196 discloses the use of certain acrylic esters as reactive diluents for oxidatively curable alkyd resins, which may contain a decahydronaphthalene or tricyclodecyl moiety. Hydroxy groups-containing addition polymers are not mentioned. Japanese Laid-Open Patent Application No. 002 357/81 discloses the use of tricyclodecane group-containing (meth)acrylic ester monomer in photocurable compositions.

The coating composition according to the invention is characterized in that the addition polymer is a polymer which is partly built up from one or more polycyclic monomers selected from the group of isobornyl (meth)acrylate and monoethylenically unsaturated compounds of decahydronaphthalene and/or tricyclo(5.2.1.0$^{2,6}$)decane as well as their substituted derivatives carrying one or more functional groups, which addition polymer has a number average molecular weight of 600–15,000 and a hydroxyl number of 30–320.

Further the invention relates to a process for coating a substrate by use of such a coating composition. The invention also relates to new binders for use in a liquid coating composition, which binders belong to the class of hydroxyl groups-containing addition polymers defined herein before.

Suitable monoethylenically unsaturated compounds of decahydronaphthalene and/or tricyclo(5.2.1.0$^{2,6}$)decane are generally reaction products of (a) a decahydronaphthyl compound and/or a tricyclo(5.2.1.0$^{2,6}$)decyl compound carrying an isocyanate group or a substituent which may form an ester group or an amide group and (b) an ethylenically unsaturated compound reactive to component (a).

As examples of suitable substituents which may form an ester group or amide group and which are carried by the decahydronaphthyl compound and/or the tricyclo(5.2.1.0$^{2,6}$)decyl compound may be mentioned a hydroxyl group, an acetal group, a carboxyl group, an acid halide group, a carboxylic anhydride group, an ester group, an oxirane group, an aziridin-1-yl group, an aziridin-2-yl group, a hemiacetal group or a primary or secondary amino group. Such groups need not necessarily be directly attached to the polycyclic hydrocarbon skeleton; they also may be attached to it via for example a methylene group, an oxygen atom or a OCH$_2$CH$_2$ group.

As representative examples of suitable decahydronaphthyl compounds or tricyclo(5.2.1.0$^{2,6}$)decane compounds with an isocyanate group or a substituent that may form an ester group or an amide group may be mentioned:

1-hydroxydecahydronaphthalene,
2-hydroxydecahydronaphthalene,
decahydronaphthalene-1-carboxyl chloride,
methyl-decahydronaphthalene-2-carboxylate,
1-aminodecahydronaphthalene,
2-aminodecahydronaphthalene,
3-hydroxytricyclo(5.2.1.0$^{2,6}$)decane,
4-hydroxytricyclo(5.2.1.0$^{2,6}$)decane,
3-hydroxymethyltricyclo(5.2.1.0$^{2,6}$)decane,
4-hydroxymethyltricyclo(5.2.1.0$^{2,6}$)decane,
tricyclo(5.2.1.0$^{2,6}$)decane-3-carboxylic acid,
tricyclo(5.2.1.0$^{2,6}$)decane-4-carboxylic acid,
tricyclo(5.2.1.0$^{2,6}$)decane-8-carboxylic acid,
8-hydroxytricyclo(5.2.1.0$^{2,6}$)decane,
1,2-epoxy-3-[tricyclo(5.2.1.0$^{2,6}$)dec-3-ylmethyl]oxypropane,
1,2-epoxy-3-[tricyclo(5.2.1.0$^{2,6}$)dec-4-ylmethyl]oxypropane,
2-[tricyclo(5.2.1.0$^{2,6}$)dec-8-yl]oxyethanol,
3-aminotricyclo(5.2.1.0$^{2,6}$)decane,
4-aminotricyclo(5.2.1.0$^{2,6}$)decane,
8-aminotricyclo(5.2.1.0$^{2,6}$)decane,
2-[tricyclo(5.2.1.0$^{2,6}$)dec-3-yl-]oxyethanol,
2-[tricyclo(5.2.1.0$^{2,6}$)dec-4-yl-]oxyethanol,
3-isocyanatotricyclo(5.2.1.0$^{2,6}$)decane,
4-isocyanatotricyclo(5.2.1.0$^{2,6}$)decane and
8-isocyanatotricyclo(5.2.1.0$^{2,6}$)decane.

The above-envisaged di- or tricyclic compounds which carry a hydroxyl group, amino group or aziridinyl group can be esterified or amidated in the usual manner with a mono-, di- or polycarboxylic acid having 1 alkenically unsaturated double bond or with an anhydride or acid halide of such a carboxylic acid or with an ester thereof with an alcohol containing, say, 1–6 carbon atoms, which results in obtaining the monoalkenically unsaturated compounds to be used according to the invention.

Examples of suitable carboxylic acids which generally contain 3–24, preferably 3–12, carbon atoms include acrylic acid, methacrylic acid, itaconic acid, citraconic acid, maleic acid, fumaric acid, tetrahydrophthalic acid, dihydroabietic acid, oleic acid and ricinoleic acid. As monoalkenically unsaturated carboxylic acid, however, also may be used a monoethylenically unsaturated hemiester having at least 1 carboxylic group, for example the hemiester of maleic acid with n-butanol or the monoester of trimellitic anhydride with allyl alcohol. Optionally, a hydroxyl group of an OH group-containing di- or tricyclic compound to be used may be etherified beforehand, for example by ethoxylation or propoxylation.

The above-envisaged di- or tricyclic compounds carrying a carboxylic group may be esterified with a monoalkenically unsaturated mono-, di- or polyhydroxy compound with 3–30, preferably 3–12, carbon atoms or a corresponding epoxy compound, or be amidated with a monoalkenically unsaturated amine.

As example of suitable hydroxy compounds or epoxy compounds may be mentioned allyl alcohol, glycidyl acrylate, glycidyl methacrylate, a hydroxyalkyl(meth)acrylate of which the alkyl group contains 2-12 carbon atoms, an alkoxylated or non-alkoxylated lacton adduct of such an alkenically unsaturated hydroxyl compound. Of course, the di- or tricyclic carboxylic compound also may be subjected to a transesterification reaction, for example with vinyl acetate, or to an esterification reaction with a monoalkenically unsaturated hemiester having at least 1 hydroxyl group. In the transesterification, esterification or amidation it is possible to use in addition to or instead of the above-envisaged di- or tricyclic carboxylic acids the corresponding acid halides or esters of an alcohol with, say, 1-6 carbon atoms.

When use is made of an isocyanate group in the decahydronaphthyl compound or tricyclo(5.2.1.0$^{2,6}$)decyl compound, or in the alkenically unsaturated compound, the other reaction component contains a substituent, for example a hydroxyl group, amino group, carboxylic group, carboxylic anhydride group, oxirane group or aziridinyl group reactive to the isocyanate group.

The above-envisaged monoalkenically unsaturated polycyclic compounds can be obtained by usual methods and need not be further described here. For convenience the group of isobornyl acrylate, isobornyl methacrylate and the monoalkenically unsaturated compounds containing the decahydronaphthalene is tricyclo(5.2.1.0$^{2,6}$)decane moiety is hereinafter referred to as polycyclic monomer. Optionally, the polycyclic monomer has a functional group, for instance an oxirane group, an amino group, a hydroxyl group or a carboxyl group.

The addition polymers to be used according to the invention are polymers of one or more polycyclic monomers, optionally with one or more monoacrylic or monomethacrylic esters of a hydroxy compound with 1-20 carbon atoms and 1-6 hydroxyl groups; alkenically unsaturated carboxylic acid or anhydrides thereof, such as acrylic acid, methacrylic acid, itaconic acid or maleic anhydride; addition polymerizable monomers such as acrylamide, methacrylamide and N-methyl(meth)acrylamide, styrene, α-methyl styrene, acrylonitrile, vinyl acetate or alkenically unsaturated polyesters or alkyd resins. Examples of suitable functional or nonfunctional acrylic or methacrylic esters include methyl acrylate, methyl methacrylate, ethyl acrylate, hydroxyethyl acrylate, hydroxyethyl methacrylate, hydroxypropyl acrylate, hydroxypropyl methacrylate, butyl acrylate, hydroxybutyl acrylate, lauryl acrylate, cyclohexyl acrylate, 2-ethylhexyl acrylate, hydroxyoctyl acrylate, dodecyl methacrylate, stearyl acrylate, trimethylol propane monoacrylate, N,N-dimethylamino-2-ethyl acrylate, N,N-diethylamino-2-ethyl acrylate, N,N-dimethylamino-2-ethyl methacrylate, N,N-diethylamino-2-ethyl methacrylate and compounds such as ethoxylated hydroxyethyl methacrylate and propoxylated hydroxypropyl methacrylate.

It is preferred that the addition polymer should be built up from 3-80% by weight, more particularly 5-50% by weight, of one or more polycyclic monomers, 0-97% by weight of one or more monoacrylic and/or methacrylic esters including 0-50% by weight, more particularly 5-35% by weight of one or more hydroxy or epoxy functional (meth)acrylic esters, and 0-30% by weight, more particularly 0-5% by weight of one or more alkenically unsaturated carboxylic esters, the balance, more particularly 0-90% by weight, being made up by other addition polymerizable monomers.

Most preferred addition polymers are built up from 5-50% by weight of the polycyclic monomer(s), 5-35% by weight of the hydroxy or epoxy functional (meth)acrylic ester(s), 0-5% by weight of (meth)acrylic acid and 10-90% by weight of non-hydroxy functional (meth)acrylic esters and/or other addition polymerizable monomers.

The preparation of the addition polymer may be carried out in a manner known in itself, for instance by polymerization in one or more steps of the respective monomer compound(s) in an organic solvent at a temperature of 50°-220° C. in the presence of one or more free radical initiators, optionally while applying ultraviolet radiation. Optionally the polymerization is carried out at elevated pressure, for example up to 500 kPa. If desired, the polymerization may be carried out in the presence of a polyester resin or alkyd resin which may or may not be alkenically unsaturated. Examples of suitable solvents include aliphatic and aromatic hydrocarbons such as toluene, xylene, petroleum ethers, methyl isobutyl ketone, methyl amyl ketone, cumene, methoxypropanol, 2-methoxypropyl acetate, ethylglycol acetate or mixtures of 2 or more of the above envisaged solvents.

Examples of free radical initiators include dibenzoyl peroxide, dicumyl peroxide, methyl ethyl ketone peroxide, cumene hydroperoxide, tert.butyloxy 2-ethylhexanoate, dicyclohexyl peroxydicarbonate, tert.butyl perbenzoate, tert.butyl cumyl peroxide, di-tert.butylperoxy-3,3,5-trimethyl cyclohexane, 1,3-bis(tert.butyl)-peroxyisopropyl benzene, N,N'-azobisisobutyronitrile and N,N'-azobisvaleronitrile. Mixtures of the initiators envisaged here are also suitable for use. The initiator is generally used in an amount of 0.1-15% by weight, preferably 0.2-10% by weight, based on the total amount of monomers.

Optionally, the polymerization may be carried out in the presence of still other substances, such as a compound for controlling the molecular weight of the addition polymer, for example:
octyl mercaptan, tert.dodecyl mercaptan and mercaptoethanol. It is preferred that the polyacrylate to be used according to the invention should have a hydroxyl number in the range of from 40 to 250.

The curable coating composition according to the invention also contains a curing agent for the addition polymer. Usual curing agents are blocked or unblocked aliphatic, cycloaliphatic or aromatic di-, tri- or polyfunctional isocyanates. Examples of suitable isocyanates include hexamethylene diisocyanate, 2,2,4-trimethyl hexane-1,6-diisocyanate, 2,4,4-trimethyl hexane-1,6-diisocyanate, cyclohexane-1,4-diisocyanate, isophoron diisocyanate, the adduct of 1 molecule of 1,4-butane diol and 2 molecules of isophoron diisocyanate, the adduct of 1 molecule of 1,4-butane diol and 2 molecules of hexamethylene diisocyanate, dicyclohexyl methane-4,4'-diisocyanate, xylene diisocyanate, 1,3,5-trimethyl 2,4-bis(isocyanatomethyl)benzene, toluene diisocyanate, diphenyl methane-4,4'-diisocyanate, the adduct of 3 molecules of hexamethylene diisocyanate and 1 molecule of water, the adduct of 1 molecule of trimethylol propane and 3 molecules of isophoron diisocyanate, the adduct of 1 molecule of trimethylol propane and 3 molecules of toluene diisocyanate, the adduct of 1 molecule of pentaerythritol and 4 molecules of hexamethylene diisocyanate and the cyclic trimer of isophoron diisocyanate.

The isocyanate compound may be blocked, if desired, by any usual or suitable blocking agent.

Instead of or in addition to the above-described curing agents other suitable agents may be employed, such as N-methylol groups—and/or N-methylol ether groups—containing aminoplasts obtained by reaction of an aldehyde, such as formaldehyde, with an amino group—or amido groups—containing compound such as melamine, urea, N,N'-ethyleneurea, dicyanodiamide and benzoguanamine; for the preparation of such compounds see, for instance, Houben-Weyl, Methoden der organischen Chemie; Vol. 14/2. pp. 319–371 (1963).

It is preferred that these compounds should entirely or partly be etherified with alcohols having 1 to 6 carbon atoms, for instance with methanol, ethanol, n-propanol, isopropanol, n-butanol, isobutanol, amyl alcohol, hexanol or mixtures of the alcohols envisaged here.

The curing agent is contained in the coating composition in an amount such that the molar ratio of the reactive groups of the curing agent to that of the addition polymer is in the range of from 0.2 to 1.7 and preferably in the range of from 0.5 to 1.5.

Optionally and depending on the field of application selected, the coating composition may contain one or more pigments, dyes and usual adjuvants, additives and polymeric compounds, such as pigment dispersing agents, anti-sag agents, agents influencing the rheological properties, corrosion inhibitors, such as metallic zinc or metallic aluminum, plasticizers, gloss improving agents and compounds promoting the curing reaction, such as p-toluene sulphonic acid or blocked products of such accelerators, diazabicyclootane (DABCO) or dibutyl tin dilaurate.

Suitable pigments comprise the usual types, viz. acid, neutral or basic pigments, which may be organic or inorganic. Optionally, the pigments may have been pre-treated for modifying their properties. Examples of suitable pigments include titanium dioxide, iron oxide red, lead chromate, carbon black and phthalocyanin pigments.

The term pigments as used here also refers to metallic pigments, such as aluminium and stainless steel, and coated mica flakes.

The coating composition may be applied to the substrate in any desired manner, for instance by roller coating, (electrostatic) spraying, brushing, sprinkling, flow coating or dipping, but preferably by spraying. Suitable substrates, which may or may not have been pretreated or been provided with one or more coats of paint, are for example of steel, aluminum, synthetic material, rubbery material, wood or wood fibre substrates. The coating composition according to the invention which has a solids content of at least 15% by weight may with advantage be applied in the automobile sector as a pigmented or non-pigmented composition, and optionally to an undercoat provided or not with a metallic pigment.

The coating composition according to the invention applied to the substrate may be cured in the usual manner, for instance at ambient temperature or at elevated temperature, for example by keeping it in a baking oven for a period of from a few seconds to 60 minutes at a temperature of, say, 50° to 400° C.

The invention also relates to a process for coating a substrate, with the coating composition according to the invention being applied to the substrate to a coating thickness of 5–300 μm and curing it.

The invention will be further described in the following unlimitative examples.

By "Solvesso 100 ®" is to be understood here a mixture of aromatic hydrocarbons with a boiling range of 162°–177° C. (available under the trade mark Solvesso 100 of Esso) and by Solvesso 150 ® a mixture of aromatic hydrocarbons with a boiling range of 187°–207° C. (available under the trade mark Solvesso 150 by Esso).

The color is determined in accordance with Gardner '33. The number average molecular weight ($\overline{Mn}$) and the weight average molecular weight ($\overline{Mw}$) are determined by Gel Permeation Chromatography, using polypropylene glycol as calibrating material. The chemical resistance is determined by measuring the resistance to xylene and to premium grade petrol over a period of 5 minutes and the resistance to 30% $H_2SO_4$ for 16 hours at 25° C. The relative solvent emission is the ratio of the emission of solvent when using a particular composition to that in the case of a control or standard composition, use being made of the same amount by weight of solid material. This implies that the lower the relative solvent emission, the less solvent will be emitted. The degree of conversion is calculated by comparing the solids content of the reaction mixture—determined by heating for 30 minutes to 150° C.—with the theoretical value.

PREPARATION OF POLYCYCLIC MONOMERS

Example A

In a reaction vessel equipped with a stirrer, a thermometer, an inlet tube for air and/or inert gas, a distillation column and a distillate receptacle there were intermixed while air was passed through: 664 grams (4 moles) of a mixture of 3- and 4-hydroxymethyltricyclo(5.2.1.0$^{2,6}$)decane, 317 grams (4.4 moles) of acrylic acid, 3.7 grams of para-toluene sulphonic acid, 1.5 grams of hydroquinone and 85 grams of toluene. The resulting mixture was heated to 110° C. and brought to the boil by reducing the pressure. Of this mixture the water formed was removed by azeotropic distillation until the acid number no longer decreased and the rate of conversion was over 96%.

Subsequently, the amount of para-toluene sulphonic acid was neutralized by adding 0.9 grams of lithium carbonate and the excess acrylic acid and the toluene still left were removed under reduced pressure at 130° C. The resulting reaction product had an acid number of 2.9, a viscosity of 2.22 cPa.s and a colour 2.

Example B

In a reaction vessel as described in Example A 415.8 grams (2.5 moles) of a mixture of 3- and 4-hydroxymethyltricyclo(5.2.1.0$^{2,6}$)decane and 245.0 grams (2.5 moles) of maleic anhydride were heated to 120° C. until the acid number was 212. A reaction product was obtained which solidified upon being cooled. The acid number was 214 and the colour of the liquid reaction product was 2.

Example C

In a reaction vessel as described in Example A 300.0 grams (1.14 moles) of the reaction product as prepared in Example B were heated to 80° C. Subsequently, propylene oxide was added dropwise at a rate such that there occurred no reflux. Propylene oxide was added until an acid number of the reaction product lower than 12 was obtained. The reaction product obtained had a colour 6, its acid number was 10.9 and its hydroxyl number 165.

Example D

In a reaction vessel as described in Example A 996 grams (6 moles) of a mixture of 3- and 4-hydroxymethyltricyclo(5.2.1.0$^{2,6}$)decane and 924 grams (6 moles) of hexahydrophthalic anhydride were heated to 120° C., while air was passed through, until the acid number was 175. Subsequently, 852.0 grams (6 moles) of glycidyl methacrylate and 0.84 grams of hydroquinone were added dropwise in such a way that the temperature did not rise to above 120° C. After the addition the mixture was kept at 120° C. until an acid number lower than 10 was attained. To the reaction mixture there were subsequently added 690 grams of Solvesso 100 ®. The resulting monomer solution had a solids content of 80% by weight, its colour was 4, its viscosity about 30 cPa.s, its acid number was 9.1 and its hydroxyl number 120-125.

Example E

In a reaction vessel as described in Example A, 180.3 grams (1 mole) of a mixture of tricyclo(5.2.1.0$^{2,6}$)decane-3-carboxylic acid and tricyclo(5.2.1.0$^{2,6}$)decane-4-carboxylic acid, 0.25 grams of hydroquinone and 0.65 grams of dimethyl coconut amine were heated to 120° C. Subsequently, 142.0 grams (1 mole) of glycidyl methacrylate were added dropwise, in such a way that the temperature did not rise to above 120° C. After the addition the mixture was kept at 120° C. until the acid number no longer decreased. The resulting reaction product had an acid number of 13.0 and a hydroxyl number of 168.

Example F

Example A was repeated except that instead of 664 grams of 3(4)-hydromethyltricyclo(5.2.1.0$^{2,6}$)decane, 608 grams (4 moles) of 8-hydroxy tricyclo(5.2.1.0$^{2,6}$)decane were used. Of the resulting reaction product the acid number was 9.4, the viscosity 2.0 cPa.s and the color was 3.

Example G

Example A was repeated, except that instead of 317 grams of acrylic acid 379 grams (4 moles) of methacrylic acid were used. A reaction product was obtained of which the acid number was 2.4, the viscosity 2.82 and the color 3.

Example H

In a reaction vessel as described in Example A, 996 grams (6 moles) of a mixture of 3- and 4-hydroxymethyltricyclo(5.2.1.0$^{2,6}$)decane, 294 grams (3 moles) of maleic anhydride and 125 grams of xylene were heated to reflux temperature until no longer any water was formed and the acid number was below 12. Subsequently, xylene was distilled off until a solution was obtained having a solids content of 90% by weight. This monomer solution had an acid number of 11.0, a color rating lower than 1 and a viscosity of 75 cPa.s.

Example J

In a reaction vessel as described in Example A 166.0 grams (1 mole) of a mixture of 3- and 4-hydroxymethyl tricyclo(5.2.1.0$^{2,6}$)decane was heated to 50° C. Subsequently 155.0 grams (1 mole) of isocyanatoethyl methacrylate were added in such a way that the temperature did not rise to above 50° C. The mixture obtained was maintained at 50° C. until no isocyanate groups (absorption 2250-2350 cm$^{-1}$) were anymore observed by infra red spectroscopy. A syrupy reaction product was obtained.

EXAMPLE 1

In a reaction vessel fitted with a stirrer, a thermometer, an inlet tube for insert gas and a reflux condenser an acrylate resin was prepared by heating a mixture of 2175 grams of Solvesso 100 ® and 103.5 grams of cumene hydroperoxide to reflux temperature (160°-165° C.). To it was added over s period of 5 hours a mixture of 705 grams of isobornyl acrylate, 705 grams of methyl methacrylate, 1635.2 grams of butyl acrylate, 373.6 grams of styrene, 72.6 grams of methacrylic acid, 876.3 grams of hydroxypropyl acrylate and 96.1 grams of tert.butyl perbenzoate. To the resulting mixture were added 270 grams of Solvesso 100 ®. The reaction mixture was kept at reflux temperatures for 3 hours until the degree of conversion was higher than 98%.

About 7000 grams of an acrylate resin solution were obtained having a solids content of 63.4% by weight, a viscosity of 56 cPa.s, and a color lower than 1. The addition polymer obtained had an acid number of 14, a hydroxyl number of 84, a $\overline{M}n$ of $1.2 \times 10^3$ and $\overline{M}w$ of $2.3 \times 10^3$.

A colorless coating composition was prepared by intermixing 557.8 grams of the acrylate resin solution prepared, 554.2 grams of a 70% by weight solution in n-butanol of a low molecular weight, highly reactive, butanol-etherified melamine formaldehyde resin (available under the trade mark Setamine US-138 BB-70 of Synthese B.V.), 27.0 grams of a 2% by weight solution of a silicone oil (available under the trade mark Baysilon OL of Bayer) in xylene and 81.5 grams of dipentene. This mixture was diluted with xylene to a viscosity of 25 sec. at 20° C. (DIN Cup No. 4). The resulting clear coating composition (solids content 50.9% by weight) was applied to a pre-treated steel panel (Bonder 132) to a layer thickness of about 45 μm (after drying). The panel coating was cured for 25 minutes at 140° C. For the ratings of the properties determined 24 hours after curing, see Table 1.

EXAMPLE 2

In a reaction vessel as described in Example 1, 2200 grams of Solvesso 100 ® with 52.8 grams of cumene hydroperoxide were heated to reflux temperature. To it were added over a period of 2 hours a mixture of 1096.6 grams of isobornyl acrylate, 716.8 grams of methyl methacrylate, 1663.2 grams of butyl acrylate, 73.7 grams of methacrylic acid, 891.2 grams of hydroxypropyl acrylate and 24.5 grams of tert.butyl perbenzoate. To it were added 272.3 grams of Solvesso 100 ®. The reaction mixture was kept at reflux temperature for 3 hours until the degree of conversion was higher than 98%. About 7000 grams of an acrylate resin solution were obtained having a solids content of 63.8%, a viscosity of 50 cPa.s, and a color lower than 1. The addition polymer obtained had an acid number of 13, a hydroxyl number of 84, a $\overline{M}n$ of $1.2 \times 10^3$ and $\overline{M}w$ of $2.3 \times 10^3$.

A colorless coating composition was prepared by intermixing 554.2 grams of the acrylate resin solution prepared, 272.0 grams of a 70% by weight solution of n-butanol of a low molecular weight, highly reactive, butanol-etherified melamine formaldehyde resin (available under the trade mark Setamine US-138 BB 70 of Synthese B.V.), 27.0 grams of a 2% by weight solution of a silicone oil (available under the trade mark Baysilon Ol of Bayer) in xylene and 81.5 grams of dipentene.

This mixture was diluted with xylene to a viscosity of 25 sec. at 20° C. (DIN Cup No. 4). The resulting clear coating composition (solids content 51.9% by weight) was applied to a pre-treated steel panel (Bonder 132) to a thickness of about 45 μm (after curing).

The panel coating was cured for 25 minutes at 140° C. The ratings of the properties determined 24 hours after curing are given in Table 1.

Comparative Example 1

Example 1 was repeated, with the exception that in the preparation of the acrylate resin 705 grams of methylmethacrylate were used instead of 705 grams of isobornyl acrylate.

About 7000 grams of an acrylate resin solution were obtained having a solids content of 63.6%, a viscosity of 105 cPa.s, a color lower than 1.

The addition polymer obtained had an acid number of 14.4, a hydroxyl number of 84, a $\overline{M}n$ of $1.3 \times 10^3$ and $\overline{M}w$ of $2.5 \times 10^3$.

In the preparation of the colorless coating composition use was made of 555.9 grams of the acrylate resins solution envisaged in this example instead of the 557.8 grams of the acrylate solution according to Example 1. The solids content of the resulting coating composition was 46.1% by weight.

TABLE 1

|  | Examples | | Comparative |
| --- | --- | --- | --- |
|  | 1 | 2 | Example 1 |
| Persoz hardness (sec) | 266 | 291 | 274 |
| Gloss Gardner (60°) | 97 | 96 | 96 |
| Erichsen penetration test (mm) | 6.0 | 5.3 | 5.8 |
| Conical mandrel (mm) | >105 | >105 | >105 |
| Adhesion (DIN 53151) | Gt 0 | Gt 0 | Gt 0 |
| Chemical resistance | good | good | good |
| Relative solvent emission (%) | 83 | 79 | 100 (control) |

EXAMPLE 3

In a reaction vessel as described in Example 1, an acrylate resin was prepared by heating 341.8 grams of Solvesso 100 ® together with 19.6 grams of cumene hydroperoxide to reflux temperature. To it there were added over a period of 5 hours a mixture of 220.0 grams of butyl acrylate, 361.7 grams of butyl methacrylate, 174.3 grams of the monomer prepared in Example A, 22.8 grams of methacrylic acid, 312.7 grams of hydroxypropyl acrylate and 19.6 grams of butyl perbenzoate. Subsequently, 27.2 grams of Solvesso 100 ® were added. The reaction mixture was kept at reflux temperature for 3 hours until the degree of conversion was higher than 98%. About 1500 grams of an acrylate resin solution were obtained having a solids content of 74.8% by weight, a viscosity of 525 cPa.s, and a color lower than 3. The addition polymer obtained had an acid number of 17.0, a hydroxyl number of 120, a $\overline{M}n$ of $1.2 \times 10^3$ and $\overline{M}w$ of $2.7 \times 10^3$.

EXAMPLE 4

In a reaction vessel as described in Example 1, an acrylate resin was prepared by heating 341.8 grams of Solvesso 100 ® together with 19.6 grams of cumene hydroperoxide to reflux temperature. To it was added over a period of 2 hours a mixture of 261.5 grams of butyl acrylate, 433.6 grams of butyl methacrylate, 81.7 grams of the monomer prepared in Example B, 312.7 grams of hydroxypropyl acrylate and 19.6 grams of tert.butyl perbenzoate.

To it were added 27.2 grams of Solvesso 100 ®. After 1 hour a mixture of 5.1 grams of tert.butyl perbenzoate and 5.1 grams of Solvesso 100 ® was added. The reaction temperature was kept at reflux temperature for 3 hours until the degree of conversion was higher than 98%. About 1500 grams of an acrylate resin solution were obtained having a solids content of 73.4% by weight, a viscosity of 286 cPa.s, and a color lower than 1. The addition polymer obtained had an acid number of 17.2, a hydroxyl number of 120, a $\overline{M}n$ of $1.3 \times 10^3$ and a $\overline{M}w$ of $2.8 \times 10^3$.

EXAMPLE 5

Example 4 was repeated, except that the added mixture consisted of 235.4 grams of butyl acrylate, 391.9 grams of butyl methacrylate, 217.9 grams of the monomer prepared in accordance with Example C, 18.5 grams of methacrylic acid, 226.6 grams of hydroxypropyl acrylate and 19.6 grams of tert.butyl perbenzoate.

About 1500 grams of an acrylate resin solution were obtained having a solids content of 73.5% by weight, a viscosity of 222 cPa.s, and a color lower than 1. The addition polymer obtained had an acid number of 15.8, a hydroxyl number of 120, a $\overline{M}n$ of $1.3 \times 10^3$ and a $\overline{M}w$ of $2.8 \times 10^3$.

EXAMPLE 6

Example 4 was repeated, with the exception that the added mixture consisted of 212.5 grams of butyl acrylate, 353.0 grams of butyl methacrylate, 340.5 grams of the monomer solution prepared in accordance with Example D, 18.5 grams of methacrylic acid, 233.1 grams of hydroxypropyl acrylate and 19.6 grams of tert.butyl perbenzoate.

About 1500 grams of an acrylate resin solution were obtained having a solids content of 73.1% by weight, a viscosity of 489 cPa.s, and a color lower than 1. The addition polymer obtained had an acid number of 16.6, a hydroxyl number of 120, a $\overline{M}n$ of $1.2 \times 10^3$ and a $\overline{M}w$ of $2.9 \times 10^3$.

EXAMPLE 7

Example 4 was repeated, except that the added mixture consisted of 212.5 grams of butyl acrylate, 354.1 grams of butyl methacrylate, 326.9 grams of the monomer prepared in accordance with Example E, 15.3 grams of methacrylic acid, 180.9 grams of hydroxypropyl acrylate and 19.6 grams of tert.butyl perbenzoate.

About 1500 grams of an acrylate resin solution were obtained having a solids content of 73.7% by weight, a viscosity of 347 cPa.s, and a color lower than 4. The addition polymer obtained had an acid number of 16.6, a hyroxyl number of 120, a $\overline{M}n$ of $1.1 \times 10^3$ and a $\overline{M}w$ of $2.5 \times 10^3$.

EXAMPLE 8

Example 3 was repeated, with the exception that in the added mixture the monomer prepared in accordance with Example A was replaced with 174.3 grams of isobornyl acrylate and the period over which the mixture was added lasted two hours instead of five.

About 1500 grams of an acrylate resin solution were obtained having a solids content of 74.8% by weight, a viscosity of 475 cPa.s, and a color lower than 1. The addition polymer obtained had an acid number of 16.3, a hydroxyl number of 120, a $\overline{M}n$ of $1.2\times 10^3$ and a $\overline{M}w$ of $2.6\times 10^3$.

EXAMPLE 9

Example 3 was repeated, with the exception that the added mixture consisted of 220.0 grams of butyl acrylate, 361.7 grams of butyl methacrylate, 179.3 grams of the monomer solution prepared in accordance with Example F, 20.7 grams of methacrylic acid, 312.7 grams of hydroxypropyl acrylate and 24.0 grams of tert.butyl perbenzoate.

About 1500 grams of an acrylate resin solution were obtained having a solids content of 74.1% by weight, a viscosity of 815 cPa.s, and a color lower than 3. The addition polymer obtained had an acid number of 17.2, a hydroxyl number of 120, a $\overline{M}n$ of $1.3\times 10^3$ and a $\overline{M}w$ of $3.2\times 10^3$.

EXAMPLE 10

Example 3 was repeated in such a way that the added mixture consisted of 257.4 grams of butyl acrylate, 328.4 grams of butyl methacrylate, 174.3 grams of the monomer prepared in accordance with Example G, 18.7 grams of methacrylic acid, 312.7 grams of hydroxypropyl acrylate and 19.6 grams of tert.butyl perbenzoate.

About 1500 grams of an acrylate resin solution were obtained having a solids content of 75.2% by weight, a viscosity of 620 cPa.s, and a color 2-3. The addition polymer obtained had an acid number of 14.7, a hydroxyl number of 120, a $\overline{M}n$ of $1.3\times 10^3$ and a $\overline{M}w$ of $3.0\times 10^3$.

EXAMPLE 11

Example 3 was repeated in such a way that the added mixture consisted of 220.0 grams of butyl acrylate, 361.7 grams of butyl methacrylate, 199.3 grams of the monomer solution prepared in accordance with Example H, 20.7 grams of methacrylic acid, 312.7 grams of hydroxypropyl acrylate and 19.6 grams of tert.butyl perbenzoate.

About 1500 grams of an acrylate resin solution were obtained having a solids content of 73.2% by weight, a viscosity of 200 cPa.s, and a color lower than 1. The addition polymer obtained had an acid number of 17.2, a hydroxyl number of 120, a $\overline{M}n$ of $1.3\times 10^3$ and a $\overline{M}w$ of $2.6\times 10^3$.

EXAMPLE 12

Example 3 was repeated, with the exception that in the added mixture the monomer prepared in accordance with Example A was replaced with 174.3 grams of the reaction product of Example J and the period over which the mixture was added lasted two hours instead of five.

About 1500 grams of an acrylate resin solution were obtained having a solids content of 74.0% by weight, a viscosity of 815 cPa.s, and a color of 2. The addition polymer obtained had an acid number of 16.5, a hydroxyl number of 120, a $\overline{M}n$ of $1.3\times 10^3$ and a $\overline{M}w$ of $2.9\times 10^3$.

Comparative Example 2

Example 2 was repeated in such a way that use was made of 1780 grams of Solvesso 100 ® and 52.8 grams of cumene hydroperoxide and the added mixture consisted of 1096.6 grams of cyclohexyl methacrylate, 756.3 grams of methyl methacrylate, 1612.3 grams of butyl acrylate, 73.7 grams of methacrylic acid, 891.2 grams of hydroxypropyl acrylate and 24.5 grams of tert.butyl perbenzoate. To it were added 110 grams of Solvesso 100 ®. About 6400 grams of an acrylate resin solution were obtained having a solids content of 69.0% by weight, a viscosity of 462 cPa.s, and a color lower than 1. The addition polymer obtained had an acid number of 15.9, a hydroxyl number of 84, a $\overline{M}n$ of $1.3\times 10^3$ and a $\overline{M}w$ of $2.7\times 10^3$.

Comparative Example 3

Example 3 was repeated in such a way that the added mixture contained 174.3 grams of dicyclopentenyloxyethyl methacrylate (CAS No. 68586-19-6) instead of the 174.3 grams of the monomer prepared in accordance with Example A and that the mixture was added over a period of two hours instead of five hours. About 1500 grams of an acrylate resin solution were obtained having a solids content of 74.7% by weight, a viscosity of 658 cPa.s, and a color 1. The addition polymer obtained had an acid number of 16.7, a hydroxyl number of 120, a $\overline{M}n$ of $1.4\times 10^3$ and a $\overline{M}w$ of $4.4\times 10^3$.

Testing non-pigmented coating compositions based on addition polymers prepared in accordance with Examples 1-12 and Comparative Examples 1-3

A coating composition was prepared by mixing the amount of acrylate resin solution mentioned in Table 2 (prepared in accordance with Examples 1-12 and Comparative Examples 1-3) and 153.0 grams of a 70% by weight solution in butanol of a low molecular weight, highly reactive, butanol etherified melamine formaldehyde resin (available under the trade mark US-138 BB-70 of Synthese B.V.). The resulting paint was diluted with a mixture of solvents consisting of 20 parts of Solvesso 100 ®, 35 parts of Solvesso 150 ®, 25 parts of xylene, 10 parts of butyl acetate and 10 parts of n-butanol to a viscosity of 25 seconds at 20° C. (DIN cup no. 4). The clear coating compositions obtained were applied to glass in a thickness of 25±2 μm (after drying). The hardness, determined 24 hours after curing for 17 minutes at 130° C., the solids content and the relative solvent emission are mentioned in Table 2.

TABLE 2

| | Amount of acrylate resin solution (g) | Konig hardness (sec) | Solids content (wt. %) | Relative solvent emission (%) |
|---|---|---|---|---|
| Example | | | | |
| 1 | 394.3 | 100 | 52.9 | 84.9 |
| 2 | 391.8 | 141 | 52.4 | 86.6 |
| 3 | 334.2 | 125 | 53.0 | 84.5 |
| 4 | 340.6 | 111 | 52.7 | 85.6 |
| 5 | 340.1 | 105 | 52.9 | 84.9 |
| 6 | 342.0 | 116 | 52.0 | 88.0 |
| 7 | 339.2 | 98 | 53.0 | 84.5 |
| 8 | 334.2 | 128 | 53.2 | 83.9 |
| 9 | 337.4 | 137 | 51.5 | 89.8 |
| 10 | 332.4 | 141 | 52.4 | 86.6 |
| 11 | 341.5 | 134 | 54.5 | 79.6 |
| 12 | 337.8 | 141 | 52.3 | 86.9 |
| Comparative example | | | | |
| 1 | 393.1 | 125 | 46.8 | 108.4 |
| 2 | 362.3 | 122 | 48.8 | 100 (control) |

TABLE 2-continued

| | Amount of acrylate resin solution (g) | Konig hardness (sec) | Solids content (wt. %) | Relative solvent emission (%) |
|---|---|---|---|---|
| 3 | 334.7 | 140 | 48.2 | 102.4 |

Testing white-pigmented coating compositions based on addition polymers prepared in accordance with the Examples 1-3, 6 and 8 and Comparative Example 1

A white composition was prepared by mixing 254 grams of rutile titanium dioxide, 120 grams of a 70% by weight solution of a low molecular weight, highly reactive, butanol-etherified melamine formaldehyde resin (available under the trade mark Setamine US-138 BB70 of Synthese B.V.) and 4.0 grams of an anionic dispersing agent (available under the trade mark SER-AD FA 196 of Servo B.V.) and grinding the mixture to a particle size of <10 μm. To it were added the amount of acrylate resin solution mentioned in Table 3 (prepared in accordance with one of the Examples 1, 2, 3, 6 and 8, or Comparative Example 1), 32 grams of the afore-mentioned melamine formaldehyde resin, 2.5 grams of a silicone oil (available under the trade mark Byk 344 of Byk-Mallinckrodt), 64.5 grams of dipentene and 5.0 grams of butanol.

The resulting paint was diluted with xylene to a viscosity of 25 seconds at 20° C. (DIN cup No. 4). The resulting white coating compositions were applied to pre-treated steel panels (Bonder 132) to a thickness of about b 45 μm (after drying). These panel coatings were subsequently cured for 25 minutes at 140° C. The properties determined 24 hours after curing are given in Table 3.

TABLE 3

| | Examples | | | | | Comparative Example 1 |
|---|---|---|---|---|---|---|
| | 1 | 2 | 3 | 6 | 8 | |
| Amount of acrylate resin solution (g) | 501.6 | 498.4 | 425.1 | 435.0 | 425.1 | 500.0 |
| Persoz Hardness (sec.) | 265 | 245 | 227 | 231 | 235 | 267 |
| Gardener Gloss | | | | | | |
| 20° | 80.1 | 75.3 | 77.6 | 77.0 | 76.3 | 79.7 |
| 60° | 92.5 | 90.6 | 90.3 | 90.4 | 90.7 | 92.0 |
| Erichson penetration test. (mm) | 5.9 | 5.3 | 5.0 | 5.7 | 5.3 | 7.0 |
| Conical mandrel (mm) | 97 | 75 | 30 | 53 | 80 | >105 |
| Chemical resistance | good | good | good | good | good | good |
| Solids content | 60.6 | 62.5 | 62.5 | 62.2 | 63.5 | 57.6 |
| Relative solvent emission (%) | 88.3 | 81.5 | 81.5 | 82.6 | 78.1 | 100 (control) |

EXAMPLE 13

In a reaction vessel as described in Example A a mixture of 234.2 grams of xylene and 286.1 grams of an alkyd resin (oil length 20%, hydroxyl number 176, acid number 20, molecular weight 1100) with on average one double bond per molecule was heated to boiling point. To it was added over a period of 105 minutes a mixture consisting of 87.0 grams of butyl acrylate, 466.7 grams of the monomer prepared in Example A, 11.8 grams of methacrylic acid, 259.8 grams of hydroxyethyl methacrylate, 23.0 grams of prim.octyl marcaptane, 4.0 grams of tert.butyl perbenzoate, 2.0 grams of di-tert.butyl peroxide and 16.3 grams of butyl acetate. After this period of 105 minutes 113.5 grams of butyl acetate were added.

About 1500 grams of an acrylate resin solution were obtained having a solids content of 75.3% by weight, a viscosity of 1400 cPa.s, and a color 3. The addition polymer obtained had an acid number of 16.3, a hydroxyl number of 145, a $\overline{Mn}$ of $1.6 \times 10^3$ and a $\overline{Mw}$ of $3.9 \times 10^3$.

Comparative Example 4

Example 13 was repeated in such a way that the added mixture consisted of 87.0 grams of butyl acrylate, 466.7 grams of styrene, 11.8 grams of methacrylic acid, 259.8 grams of hydroxyethyl methacrylate, 33.6 grams of prim. octyl mercaptane, 5.4 grams of tert.butyl perbenzoate, 3,3 grams of di-tert.butyl peroxide and 16.3 grams of butyl acetate.

About 1500 grams of an acrylate resin solution were obtained having a solids content of 75.0% by weight, a viscosity of 13700 cPa.s, and a color 2. The addition polymer obtained had an acid number of 15.4, a hydroxyl number of 145, a $\overline{Mn}$ of $1.5 \times 10^3$ and a $\overline{Mw}$ of $4.0 \times 10^3$.

EXAMPLE 14

In a reaction vessel as described in Example A 215 grams of butyl acetate were heated to boiling point. To it was added over a period of 105 minutes a mixture of 240.2 grams of butyl acrylate, 411.8 grams of the monomer prepared in Example G, 11.9 grams of methacrylic acid, 347.6 grams of hydroxyethyl methacrylate, 28.3 grams of prim.octyl mercaptane, 4.8 grams of tert.butyl perbenzoate, 3.0 grams of di-tert.butyl peroxide and 15.0 grams of butyl acetate. Subsequently, 65.0 grams of butyl acetate were added.

About 1500 grams of an acrylate resin solution were obtained having a solids content of 69.8% by weight, a viscosity of 1740 cPa.s, and a color lower than 1. The addition polymer obtained had an acid number of 11.9, a hydroxyl number of 145, a $\overline{Mn}$ of $2.2 \times 10^3$ and a $\overline{Mw}$ of $4.9 \times 10^3$.

EXAMPLE 15

The procedure of Example 14 was repeated, except that the added mixture contained 411.8 grams of isobornyl acrylate instead of 411.8 grams of the monomer prepared in Example G.

About 1500 grams of an acrylate resin solution were obtained having a solids content of 69.6% by weight, a viscosity of 533 cPa.s, and a color 2. The addition polymer obtained had an acid number of 11.9, a hydroxyl number of 145, a $\overline{M}n$ of $2.1\times 10^3$ and a $\overline{M}w$ of $4.7\times 10^3$.

Comparative Example 5

Example 14 was repeated in such a manner that the added mixture consisted of 240.2 grams of butyl acrylate, 411.8 grams of styrene, 11.9 grams of methacrylic acid, 347.6 grams of hydroxyethyl methacrylate, 38.6 grams of prim-octyl mercaptane, 6.7 grams of butyl perbenzoate, 4.2 grams of di-tert.butyl proxide and 15.0 grams of butyl acetate.

About 1500 grams of an acrylate resin solution were obtained having a solids content of 70.0% by weight, a viscosity of 14300 cPa.s, and a color lower than 1. The addition polymer obtained had an acid number of 12.4, a hydroxyl number of 145, a $\overline{M}n$ of $2.1\times 10^3$ and a $\overline{M}w$ of $4.8\times 10^3$.

Testing white-pigmented coating composition based on addition polymers prepared in accordance with Examples 12-14 and Comparative Examples 4 and 5 in a 2-component system A white coating composition was prepared by mixing 90 grams of rutile titanium dioxide, the amount of acrylate resin solution given in Table 4 (prepared in accordance with one of the Examples 13-15 or Comparative Examples 4-5) and 20 grams of a solvent consisting of 40 parts of xylene, 30 parts of butyl acetate and 30 parts of 2-methoxypropyl acetate and grinding the mixture to a fineness of <10 μm. To 100 grams of the ground mixture were added 3.0 grams of a 1% by weight solution in xylene of a silicone oil (commercially available under the trade mark Baysilon-A of Bayer), 62.3 grams of the afore-described acrylate resin solution and 44.1 grams of a 75% by weight solution in xylene of the adduct of 3 molecules of hexamethylene diisocyanate and 1 molecule of water (available under the trade mark Desmodur-N 75 of Bayer). Subsequently, the paint was diluted with the above solvent mixture to a viscosity of 20 seconds at 20° C. (DIN cup No. 4). The resulting white coating compositions were applied to a pretreated steel panel (Bonder 132) to a layer thickness of 45±5 μm (after drying). Subsequently, the panels were cured at 23° C. and 50% relative humidity.

For the properties during and after drying see Table 4.

TABLE 4

|  | Examples | | | Comparative examples | |
| --- | --- | --- | --- | --- | --- |
|  | 13 | 14 | 15 | 4 | 5 |
| Amount of acrylate resin solution (g) | 39.8 | 50.3 | 50.7 | 40.4 | 49.9 |
| Initial viscosity (sec) | 20 | 20 | 20 | 20 | 20 |
| after 2 hours | 20.5 | 22.5 | 23 | 23 | 23 |
| after 4 hours | 23 | 28.5 | 26.5 | 28 | 25 |
| after 8 hours | 40 | — | — | >90 | — |
| after 24 hours | — | — | — | — | — |
| Dust dry after stated number of hours | 1 | 1.5 | 1.5 | 1 | 1 |
| Konig hardness (sec) | 137 | 125 | 125 | 140 | 142 |
| Gardener Gloss | | | | | |
| 20° | 84 | 82 | 82 | 87 | 78 |
| 60° | 92 | 90 | 90 | 93 | 87 |
| Erichsen penetration test (mm) | 8.5 | 9.7 | 9.7 | 8.0 | 9.7 |
| Conical mandrel | 0 | 0 | 0 | 0 | 0 |
| Adhesion | Gt 0-1 | Gt 0 | Gt 0 | Gt 0-1 | Gt 0 |
| Impact strength | | | | | |
| direct | >36 | >36 | >36 | 32 | >36 |
| indirect | >36 | 34 | >36 | 17 | >36 |

TABLE 4-continued

|  | Examples | | | Comparative examples | |
| --- | --- | --- | --- | --- | --- |
|  | 13 | 14 | 15 | 4 | 5 |
| Resistance to xylene | good | good | good | good | good |
| Solids content (wt. %) | 62.8 | 58.6 | 59.5 | 58.9 | 53.5 |
| Relative solvent emission (%) | 84.9 | 81.3 | 78.3 | 100[1] | 100[2] |

[1]Control composition for Example 13
[2]Control composition for Examples 14 and 15

I claim:

1. A liquid, curable coating composition comprising a hydroxyl groups-containing addition polymer as binder and a curing agent, wherein the addition polymer is a polymer which is partly built up from one or more polycyclic monomers selected from the group consisting of isobornyl acrylate, isobornyl methacrylate, monoalkenically unsaturated compounds of decahydronaphthalene and/or tricyclo($5.2.1.0^{2,6}$)decane, and their substituted derivatives carrying one or more functional groups, said addition polymer having a number average molecular weight of 600-15,000 and a hydroxyl number of 30-320.

2. A coating composition according to claim 1, wherein 3-80% by weight of the addition polymer is built up from one or more of said polycyclic monomers.

3. A coating composition according to claim 1, wherein the monoalkenically unsaturated compound is a reaction product of (a) a decahydronaphthyl compound and/or a tricyclo($5.2.1.0^{2,6}$)decyl compound carrying an isocyanate group or a substituent which may form an ester group or an amide group and (b) an alkenically unsaturated compound reactive to component (a).

4. A coating composition according to claim 1, wherein the addition polymer is built up from 3-80% by weight of one or more of said polycyclic monomers, 0-97% by weight of one or more monoacrylic and/or monomethacrylic esters and 0-30% by weight of one or more alkenically unsaturated carboxylic acids, the balance being made up by one or more other addition polymerisable monomers.

5. A coating composition according to claim 4, wherein the addition polymer is built up from 3-80% by weight of one or more of said polycyclic monomers, 0-50% by weight of one or more hydroxy or epoxy functional monoacrylic or monomethacrylic esters and 0-30% by weight of one or more alkenically unsaturated carboxylic acids, the balance being made up by (meth)acrylic esters and/or other addition polymerisable monomers.

6. A coating composition according to claim 5 wherein the addition polymer is built up from 5-50% by weight of one or more of said polycyclic monomers, 5-35% by weight of one or more hydroxy or epoxy functional monoacrylic or monomethacrylic esters, 0-5% by weight of (meth)acrylic acid and 10-90% by weight of (meth)acrylic esters and/or other addition polymerisable monomers.

7. A coating composition according to claim 1, wherein the addition polymer has a hydroxyl number in the range of from 40 to 250.

8. A process for coating a substrate, wherein a coating composition is applied to the substrate to a thickness of 5-300 μm and subsequently cured, wherein said coating composition is the coating composition according to claim 1.

9. Binder for use in a liquid, curable coating composition, comprising a hydroxyl groups-containing addition polymer which is partly built up from one or more polycyclic monomers selected from the group consisting of isobornyl acrylate, isobornylmethacrylate, monoalkenically unsaturated compounds of decahydronaphthalene and/or tricyclo(5.2.1.0$^{2,6}$)decane and their substituted derivatives carrying one or more functional groups, said addition polymer having a number average molecular weight of 600–15000 and a hydroxyl number of 30–320.

* * * * *

UNITED STATES PATENT AND TRADEMARK OFFICE
CERTIFICATE OF CORRECTION

PATENT NO. : 4,605,719

DATED : August 12, 1986

INVENTOR(S) : Frank C. Peelen

It is certified that error appears in the above-identified patent and that said Letters Patent is hereby corrected as shown below:

Column 1, line 65, change "carboxyl" to -- carbonyl --.

Column 3, line 40, change "acid" to -- acids --.

Column 8, line 14, after "over" delete the "s" and insert -- a --.

Signed and Sealed this

Ninth Day of December, 1986

Attest:

DONALD J. QUIGG

*Attesting Officer*          *Commissioner of Patents and Trademarks*

UNITED STATES PATENT AND TRADEMARK OFFICE
CERTIFICATE OF CORRECTION

PATENT NO. : 4,605,719

DATED : August 12, 1986

INVENTOR(S) : Peelen

It is certified that error appears in the above-identified patent and that said Letters Patent is hereby corrected as shown below:

On the cover page, in Item No. 73 please change "Aszo" to -- Akzo --.

Signed and Sealed this

Third Day of February, 1987

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,605,719

DATED : August 12, 1986

INVENTOR(S) : Frank C. Peelen

It is certified that error appears in the above-identified patent and that said Letters Patent is hereby corrected as shown below:

Column 1, line 65, "carbonyl" should read -- carboxyl --.

Column 3, line 40, "acid" should read -- acids --.

Column 8, line 14, after "over" delete the "s" and insert -- a --.

This certificate supersedes Certificate of Correction issued December 9, 1986.

Signed and Sealed this

Tenth Day of November, 1987

Attest:

DONALD J. QUIGG

*Attesting Officer*

*Commissioner of Patents and Trademarks*